United States Patent [19]

Kauss

[11] Patent Number: 4,955,445
[45] Date of Patent: Sep. 11, 1990

[54] HYDROSTATIC AUXILIARY POWER STEERING MECHANISM FOR MOTOR VEHICLES

[75] Inventor: Wolfgang Kauss, Lohr-Wombach, Fed. Rep. of Germany

[73] Assignee: Mannesmann Rexroth GmbH, Lohr/Main, Fed. Rep. of Germany

[21] Appl. No.: 268,777

[22] Filed: Nov. 9, 1988

[30] Foreign Application Priority Data
Nov. 9, 1987 [DE] Fed. Rep. of Germany ....... 3738047

[51] Int. Cl.$^5$ .............................................. B62D 5/08
[52] U.S. Cl. .................................. 180/133; 74/388 PS
[58] Field of Search ....................... 180/132, 133, 79.1; 74/388 PS

[56] References Cited

U.S. PATENT DOCUMENTS

| 4,645,025 | 2/1987 | Ohe et al. | 180/79.1 |
| 4,708,220 | 11/1987 | Noto et al. | 180/79.1 |
| 4,736,811 | 4/1988 | Marosen et al. | 180/133 |

FOREIGN PATENT DOCUMENTS

| 3006509 | 8/1981 | Fed. Rep. of Germany | 180/133 |
| 0787240 | 12/1980 | U.S.S.R. | 180/133 |

Primary Examiner—Richard A. Bertsch
Assistant Examiner—Mitchell Bompey
Attorney, Agent, or Firm—Burns, Doane, Swecker & Mathis

[57] ABSTRACT

A hydrostatic auxiliary power steering mechanism for motor vehicles is described, in which the steering cylinder power is controlled by a servo mechanism for which a control loop is provided for regulating oil quantity proportional to the turning of the steering wheel. This control loop is connected in parallel to a hand pump driven by the steering wheel. In this way, the transmission ratio of the hand pump can be selected independently of the auxiliary power control loop in such a way that the vehicle remains steerable in all operating conditions. Moreover, there results the possibility of designing the auxiliary power control loop with external feedback in such a way that disturbance variables of a control system comprising the steering valve, the steering cylinders and the steering linkage can be controlled.

11 Claims, 6 Drawing Sheets

HYDROSTATIC AUXILIARY POWER STEERING MECHANISM FOR MOTOR VEHICLES

BACKGROUND AND SUMMARY OF THE INVENTION

The invention relates to a hydrostatic auxiliary power steering mechanism for motor vehicles. This type of auxiliary power steering mechanism is generally known from DE-3037206 A1 and from FIG. 3 of DE-OS 2058731.

Conventional hydrostatic auxiliary power steering mechanisms of the type described above are provided with a servo mechanism acting as a power amplifier for the steering mechanism. For this purpose, there is incorporated into the servo mechanism a steering motor, for example, in the form of an orbit hydromotor which, in conjunction with an upstream servo steering valve, can conduct servo hydraulic fluid to the steering cylinders. The steering valve and steering motor together constitute one steering unit, an example of which is shown in FIG. 1, to which reference is now made. The steering motor is designated in this figure by the reference symbol 2 and the servo steering valve by the reference symbol 4. A line 6 carrying servo hydraulic pressure P is conducted through the continuously adjustable distributing valve as servo steering valve 4 and discharged into tank or reservoir T in the neutral position in accordance with FIG. 1. As a function of the turning motion [psi]$_w$, a corresponding position of the servo valve 4 is obtained, as delayed by spring 8, whereby the line 6 is switched onto one of the two working lines L or R by the steering motor 2. The steering valve 4 and the steering motor 2 are thus a component of a servo control loop which meters a hydraulic stream QV to a steering cylinder. This relationship becomes clearer in FIG. 2, which represents a block diagram of a conventional hydrostatic auxiliary power steering mechanism. The steering wheel turning angle should be regarded as the command variable [psi]$_w$. The actual turning angle of the steering motor is designated as [alpha]$_x$. This creates an internal feedback loop for the steering unit which consists of a steering motor and a steering valve, whereby errors in the transmission signal can be controlled.

When the hydraulic energy supply fails, i.e., when the servo pressure P, for example, falls to zero, the steering motor 2 in the conventional hydrostatic auxiliary power steering mechanism is converted to a hand pump driven by the steering wheel with which the steering cylinders can be fed through the lines L and R.

Aside from the fact that the possibilities for optimization are limited in customary hydrostatic auxiliary power steering mechanisms due to the close connection between signal flow and energy flow, it has turned out to be particularly disadvantageous that the steering forces are often too great when the servo mechanism fails. The system-related reason for this is that an adjustment of the servo valve 4 to the steering motor 2 must be undertaken in order to provide optimal servo operation. However, this means that the power transmission between the steering wheel motion and the steering gear is established and cannot be changed.

An object of the invention, therefore, is to develop a hydrostatic auxiliary power steering mechanism such that, with a servo mechanism optimally adjusted to the steering system, it is guaranteed that even the heaviest vehicles remain easily steered even in the event of failure of the servo mechanism.

By means of the invention, the transmission ratio for the emergency steering function can be designed so that it is independent of the control loop of the servo mechanism, using the hand pump driven by the steering wheel. The control and design engineers thereby gain more flexibility in the design of the hydrostatic auxiliary power steering mechanism, so that optimal conditions for the achievement of a desired steering characteristic can be created. For example, the dynamic and static transmission behavior of the steering system can be adapted to comfort and maneuverability requirements, free from external pressures, using the controller which is isolated from the hand pump. This results in the additional advantage that the control system can be expanded so that a larger number of disturbance parameters can be taken into consideration in the control process. This results in further advantages in terms of construction. For one thing, only the hand pump with two hydraulic lines is still located in the vicinity of the driver's seat, whereas in the state of the art, the hydraulic energy with four or five pipes or fluid conduits had to be laid near the driver's seat. Because the auxiliary hydraulic energy can now be conducted directly to the steering cylinders, the integration of the hydraulic components into a system with multiple users is simplified. Finally, the system is adaptable to extensive integration of standard elements into existing hydraulic systems, for example, the use of proportional valves. Although the principle of connecting a hand pump driven by the steering wheel in parallel to the auxiliary pump driven by a motor is known (DE 2655379 A1), the steering valve controlling the hydraulic auxiliary energy supply is located downstream of the connection of the auxiliary pump line and the hand pump line so that the steering valve always remains active, i.e., even during hand steering operation. This results necessarily in detectable differences in the steering response as a function of whether the servo mechanism is active or inactive.

Accordingly, all disturbance variables affecting the control system between the steering valve and the steering linkage can be controlled.

With the switchgear provided between the steering valve and the steering cylinders, the hand pump driven by the steering wheel can be in constant contact with the control system. When the servo mechanism fails, therefore, the regulating signal of the hand pump is immediately available, so that the vehicle can be reliably steered in every phase of operation. This was not possible prior to the parallel connection of the steering valve and hand pump in accordance with the present invention, whereby the hand pump is thus essentially running continuously in the background of the servo mechanism.

When a microcontroller is used as the controller, additional advantages result in terms of operational safety of the steering system. This kind of microcontroller is not only capable of executing the actual control algorithm but can also execute safety and diagnostic algorithms. Moreover, additional reference values or auxiliary control variables can be supplied to such a microcontroller, which makes it possible to easily adapt the steering behavior to the driving conditions.

The circuit element of the hydrostatic auxiliary power steering mechanism according to the invention opens up the possibility of integrating into the hydraulic system a preferably proportional action servo steering valve. The invention also contemplates that the emergency steering function using the hand pump takes over only when the pressure in the auxiliary line is greater than that in the corresponding working line. Moreover, return valves prevent the steering wheel from turning under the influence of the pressure in the steering cylinder.

The invention further contemplates that the auxiliary lines are always adequately supplied with pressurized fluid so that the immediate response of the emergency steering is guaranteed.

The pump which supplies hydraulic fluid to the servo mechanism may be a pump with fixed displacement. It is also possible, however, to retain the servo steering valve as a standard element and to work with a regulated or variable displacement pump, as is the case with load-sensing circuits. In this case, it is advantageous to design the servo valve as a hydraulically pilot-controlled load-sensing servo valve and to conduct the load status line through a pilot valve which either discharges the load status line into the tank or closes it, creating a load pressure signal, depending on the level of pilot pressure, which is preferably formed by a pressure regulating valve with three controlled connections.

It is advantageous to conduct the load status signal to a return valve logic, which switches on the emergency steering function if the load status signal falls below a certain predetermined value. For example, this kind of return valve logic can be in the form of two inverted shuttle valves connected in parallel to which from one side pressure is admitted from the load status line and on the other side from the auxiliary lines and which control the discharge to the tank. In this way, the pressure in the auxiliary lines is reduced below a certain threshold in the presence of a load status signal.

In place of this return valve logic, it is also possible to use a pilot valve which is triggered directly by the pilot pressure of the load-sensing servo valve.

The invention also considers a servo steering valve, in which the working line not under servo pump pressure can be switched to tank or reservoir using this valve. A simplified arrangement of the servo steering valve is achieved when the return valves integrated into the working lines upstream of the openings of the accompanying auxiliary pressure lines prevent a pressure drop in the working line from occuring through the servo steering valve during emergency steering operation.

Further, during pure hand pump operation, the oil displaced into the working line loaded with the least pressure can flow to the tank.

In order to eliminate the effect on steering of malfunctions, whether electronic or hydraulic, in the controlled auxiliary power, it is advantageous to integrate into the working line upstream of each return valve a hydraulically pilot-controlled return valve to which pressure is admitted from the direction of the steering valve in the direction of closing and whose accompanying control pressure line is connected to the side of the hand pump, through which the relevant working line can be fed. Using these two hydraulically pilot-controlled return valves, the hydraulic auxiliary energy is always decoupled or inoperative when the support direction and the steering direction given by the hand pump do not agree.

By the use of highly disturbance-proof return valves, a pressure divider circuit is created which allows a load pressure reduced in constant proportion to the working pressure to become active on the hand pump driven by the steering wheel. A reaction feeling is thus constantly transmitted to the driver of the vehicle even in the servo-supported steering operation, reflecting the forces working on the wheels. A further advantage of this arrangement is to be viewed in the fact that the hydraulic resistors, i.e., screens, are arranged in such a way that complete or partial closure cannot trigger safety problems but rather, at the worst, can lead to sacrifices in comfort.

Further simplifications of the safety circuit provided for the auxiliary power steering result from the developments of the invention.

DETAILED DESCRIPTION OF THE EMBODIMENTS

Figure 1:
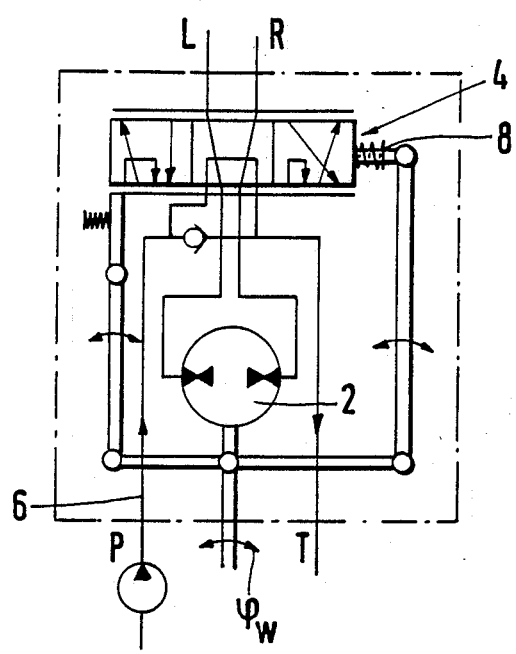
FIG. 1 a schematic representation of a customary steering unit with a steering motor and a servo steering valve connected in series.
Figure 2:
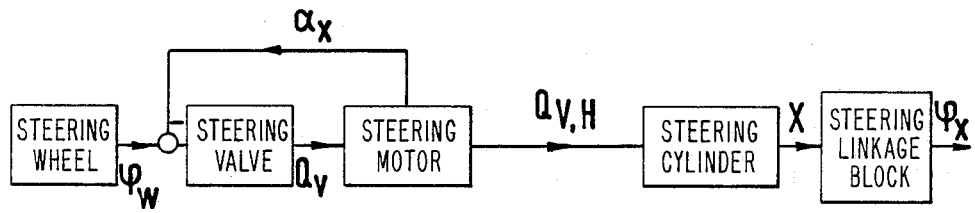
FIG. 2 a block diagram of a customary hydrostatic auxiliary power steering mechanism into which a steering unit according to FIG. 1 is integrated.
Figure 3:
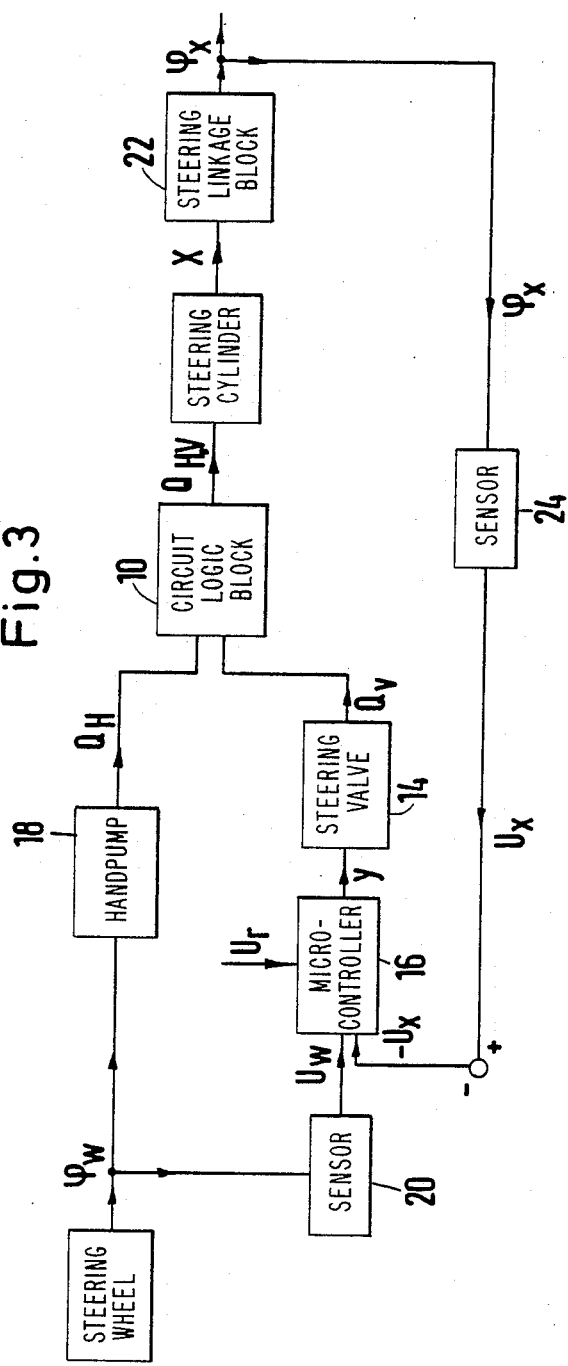
FIG. 3 in a presentation similar to that of FIG. 2, a block diagram of the hydrostatic auxiliary power steering mechanism according to the invention.

It is clear from FIG. 3 how the hydrostatic auxiliary power steering mechanism according to the invention differs structurally from the customary auxiliary power steering mechanism according to FIG. 2. According to the invention, pressure is admitted in parallel to the steering cylinders and steering linkage by inserting therebetween a circuit logic block 10. On the one hand, the output signal $Q_V$ of the steering valve 14 which is triggered by a microcontroller 16, of the type discussed, is present on the circuit logic block 10. Parallel to this, another signal flow is conducted to the circuit logic block 10. This signal flow goes from the steering wheel through a hand pump 18 coupled with the steering wheel whose output signal $Q_H$ is proportional to the stream volume transported by the hand pump. The angular position of the steering wheel is again designated in FIG. 3 by $[psi]_w$. By inserting a sensor 20 in between, the variable $[psi]_w$ is transformed into the command variable $u_w$ of the controller 16, whose control variable is designated by y and is conducted to the steering valve 14. The stream volume discharged by the steering valve 14 for amplification of the steering power is designed by $Q_V$.

In a further difference from the customary hydrostatic auxiliary power steering mechanism according to FIG. 2 with an internal feedback in the region of the steering unit, the auxiliary power steering mechanism according to the invention has an external feedback loop of a regulating signal $[psi]_x$ of a steering linkage block 22. In the feedback loop, this signal is conducted past another sensor 24 which transforms it into the control variable $u_x$ which is conducted to the controller 16.

The external feedback of the variable $[psi]_x$ expands the control system in the hydrostatic auxiliary power steering mechanism according to the invention to include the steering valve, the steering cylinders and the steering linkage, so that all disturbances in the region of this control system can be controlled. Furthermore, one can see from the block diagram in FIG. 3 that the control loop for the servo mechanism can be designed to be independent of the drive of the hand pump 18 by the steering wheel. In this way, one has very high flexibility with regard to the design of the transmission ratio between steering wheel, hand pump and steering linkage. Moreover, the embodiment in FIG. 3 shows that the auxiliary hydraulic energy, represented by the variable $Q_Y$, can be conducted directly to the steering cylinders. This results not only in an improvement of the transmission but also in the additional advantage that only the hand pump 18, with two hydraulic lines, must be located in the vicinity of the driver's seat. The signal processing can be further improved in this manner.

By separating the controller from the hand pump it is also possible to conduct additional auxiliary control variables ($u_r$) to the controller 16 without providing additional compensation circuits. In this way, it is very easy to accomplish automation or remote control of the power support.

A first hydraulic circuit for the hydrostatic auxiliary power steering mechanism according to the invention is described in more detail below with reference to FIG. 4. Those components which correspond to the elements of the block diagram in FIG. 3 are designated with identical reference symbols.

As a function of the turning angle $[psi]_w$ of a steering wheel 26, with insertion of the sensor 20, the command variable $u_w$ is conducted to the controller 16, in the form of a microcontroller. Simultaneously, the control variable $u_x$ is switched to the microcontroller representing the output signal of a sensor 24 which transforms the actual regulating angle $[psi]_x$ of the steering linkage 22. A steering cylinder 28 has two working chambers 28R and 28L.

As a function of the difference between command variable $u_w$ and control variable $u_x$ and, if applicable, as a function of at least one further auxiliary control variable $u_r$, the microcontroller transmits regulating signals $i_{y1}$ or $i_{y2}$ in order to trigger the steering valve 14 in the form of a continuously adjustable distributing valve or preferably a proportional action servo valve. The servo valve controls four connections, one P-connection 30, one T-connection 32, one R-connection 34 and one L-connection 36. The P-connection 30 is fed by a pump 38 which, in the embodiment according to FIG. 4, is a pump with fixed displacement. The R-connection 34 is in contact with the working chamber 28R via an R-working line 40, whereas the L-connection 36 is in contact with the working chamber 28L via an L-working line 42. The components described thus far are a component of the control loop for activation of steering as described by FIG. 3.

In order to ensure, in the event of failure of the servo mechanism, for example, in the event of the failure of the pump 38, that the steering linkage 22 can still be activated from the steering wheel, the hand pump 18 in steering valve 14 is connected in parallel. Depending on the direction the steering wheel 26 is turned, the hand pump 18 admits pressure to one of two auxiliary pressure lines 44 and 46, of which the line 44 shall be referred to hereafter as the R-auxiliary line and the line 46 as the L-auxiliary line. The R-auxiliary line 44 is connected to the R-working line by a return valve 48. The L-auxiliary line 46 is connected analogously to the L-working line 42 by a return valve 50. Moreover, each auxiliary pressure line 44 and 46 is provided with a back non-return check valve 52 and 54, respectively, through which hydraulic fluid can be pulled out of the tank or reservoir line 55 in the event of a pressure reduction in the auxiliary lines 44 and 46.

In this first execution of the hydrostatic auxiliary power steering mechanism, the two return valves 50 and 48 form the circuit logic block designated as 10 in FIG. 3. As long as the servo pressure is built up in one of the working lines 40 or 42, the corresponding return valve 48 or 50 decouples the auxiliary pressure line 44 or 46 respectively. However, as soon as the servo pressure in the working lines falls below a pre-determined level which is determined by the spring of the return valves 48 and 50, the working lines may be fed via the auxiliary pressure lines 44 or 46 so that the emergency steering function is provided without interruption. In order to guarantee that, during pure hand pump operation, the flow agent or oil displaced from the steering cylinder part 28L or 28R being discharged, can flow to the tank, an inverted shuttle valve 84 is provided between the two working lines 40 and 42, with a connection 86 to the tank which is constantly connected to the working line carrying the least pressure.

Figure 4:
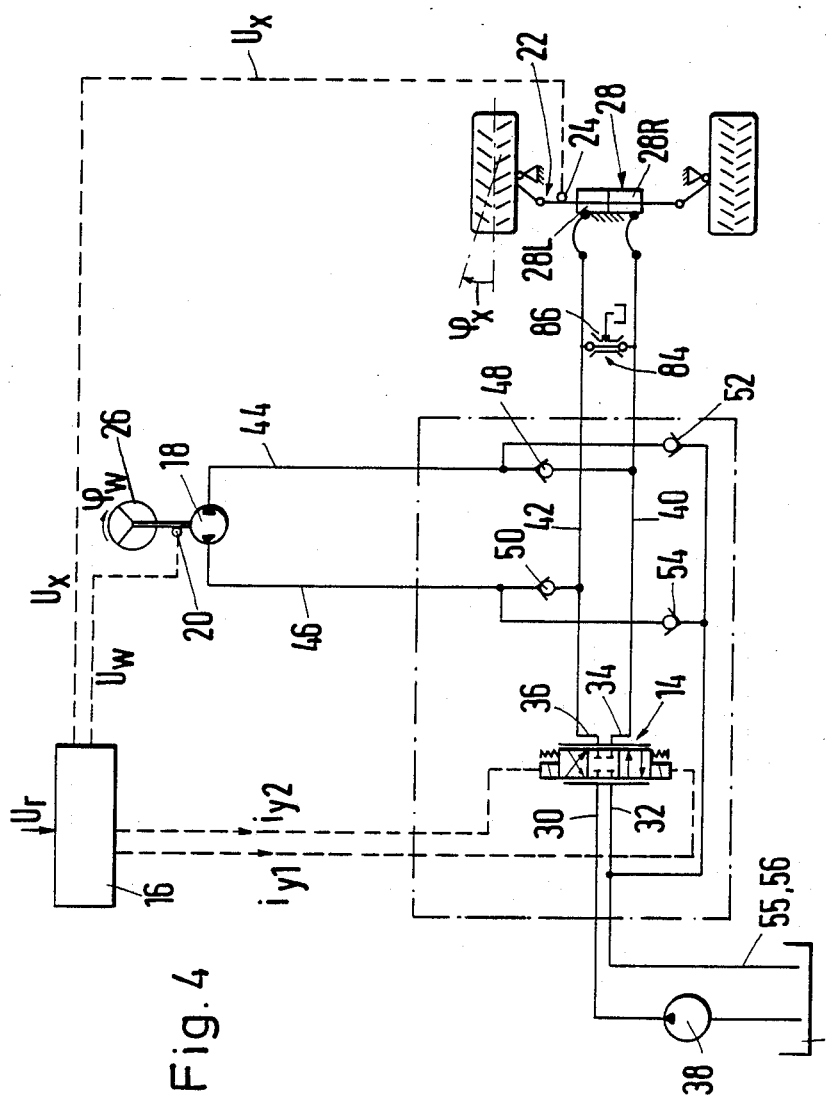
FIG. 4 a hydraulic switching circuit for a first embodiment of the hydrostatic auxiliary power steering mechanism according to the invention.
Figure 5:
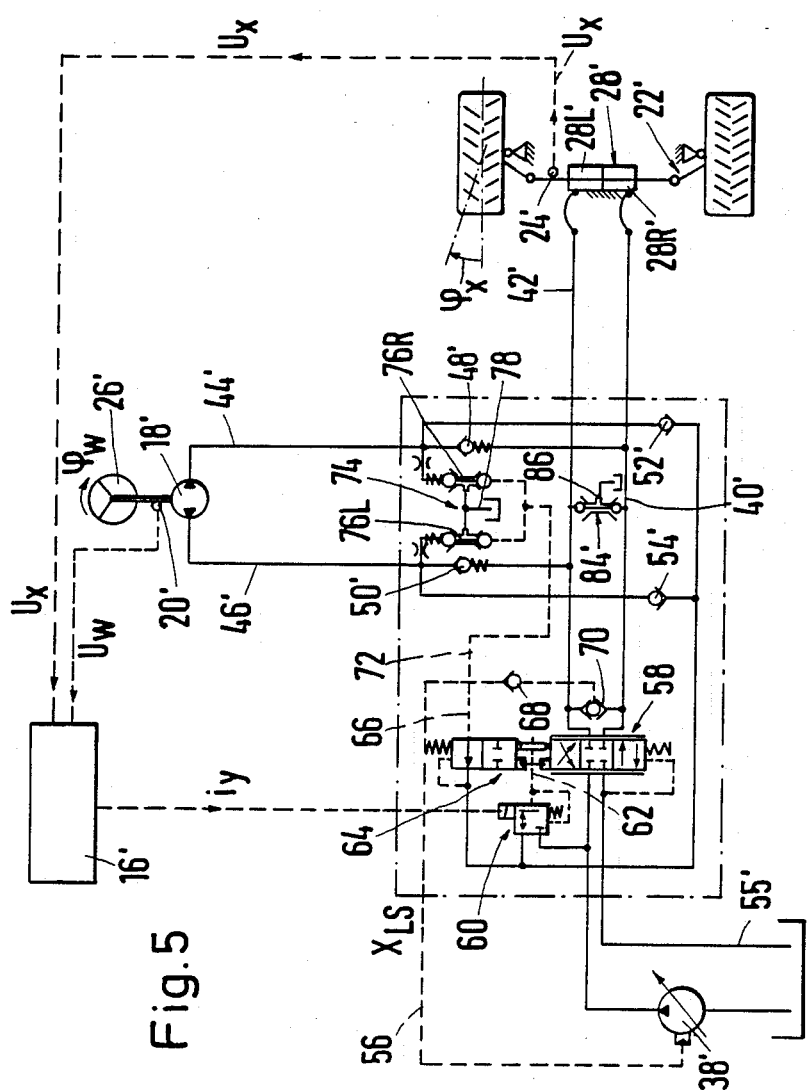
FIG. 5 a hydraulic switching circuit for a further embodiment of the hydrostatic auxiliary power steering mechanism.

In FIG. 5, another embodiment of the hydrostatic auxiliary power steering mechanism is explained using a hydraulic switching circuit. To simplify the description, those components which were already used in the hydraulic switching circuit in FIG. 4 are labeled with identical reference symbols, but with an apostrophe appended. The major difference between the execution according to FIG. 5 and that according to FIG. 4 is that the circuit element according to FIG. 5 serves as an energy supply for a load-sensing hydraulic system. To this end, the pump 38' is equipped as a regulated or variable pump, i.e., as a pump with regulatable displacement volume. A load status line 56 which conducts a load status signal $X_{LS}$, is connected to the regulated pump 38'. A hydraulically pilot-controlled proportional action load-sensing servo valve 58 is provided in place of the steering valve 14 according to FIG. 4. For this purpose, a pressure regulating valve 60 with three controlled connections is provided. The pressure regulating valve is triggered electrically by the regulating signal $i_y$ of the microcontroller 16'. A pilot pressure line 62 is conducted to both the load-sensing distributing valve 58 and a pilot valve 64 which, as a function of the amount of pressure in the pilot pressure line 62, connects the load status line 56 via a branch line 66 with the return line 55'. In this case, no load pressure can build up in the load status line. As soon as the connection between the branch line 66 and the return line 55' is interrupted, the load status signal $X_{LS}$ is switched to load pressure via a return valve 68 and a shuttle valve 70 so that the pump 38' can be regulated according to the load.

In the embodiment of the hydrostatic auxiliary power steering mechanism shown in FIG. 5, the invention includes the fact that the load status signal $X_{LS}$ is used to trigger the circuit logic (circuit logic block 10 in FIG. 3). A further control line 72 branches off from the load status line 56 and is conducted to a return valve logic 74. This return valve logic has two inverted shuttle valves 76L and 76R connected in parallel to which on one side pressure is admitted from the control line 72 and on the other side through a choke or restriction from either the L- or R-auxiliary line 46' or 44'. The two inverted shuttle valves have a joint tank connection 78. This construction results in the following manner of operation:

As long as the servo support is in operation, i.e., the regulated pump 38' is feeding hydraulic fluid into one of the two working lines 40' or 42' as a function of the load status signal $X_{LS}$, a control pressure is active in the control line 72 which admits pressure to the two shuttle valves 76R and 76L, which connects the two auxiliary pressure lines 44' and 46' to the tank connection 78. The pressure in the auxiliary lines 44' and 46' can therefore not continue through the return valves 48' and 50' into the working lines 40' and 42'. However, as soon as the load status signal $X_{LS}$ stops, the inverted shuttle valves 76R and 76L close the connection between tank connection 78 and the auxiliary lines 44' and 46' so that the effect of the hand pump 18' can now cause a steering pressure to build up which can be transmitted to the relevant working line 40' or 42' through the return valves 48' or 50', respectively. The transmission ratio of the hand pump 18' is chosen independently of the auxiliary power control loop in such a way that the vehicle remains steerable in all operating conditions, i.e., an auxiliary hydraulic power is generated which fulfills requirements in all operating conditions.

Figure 6:
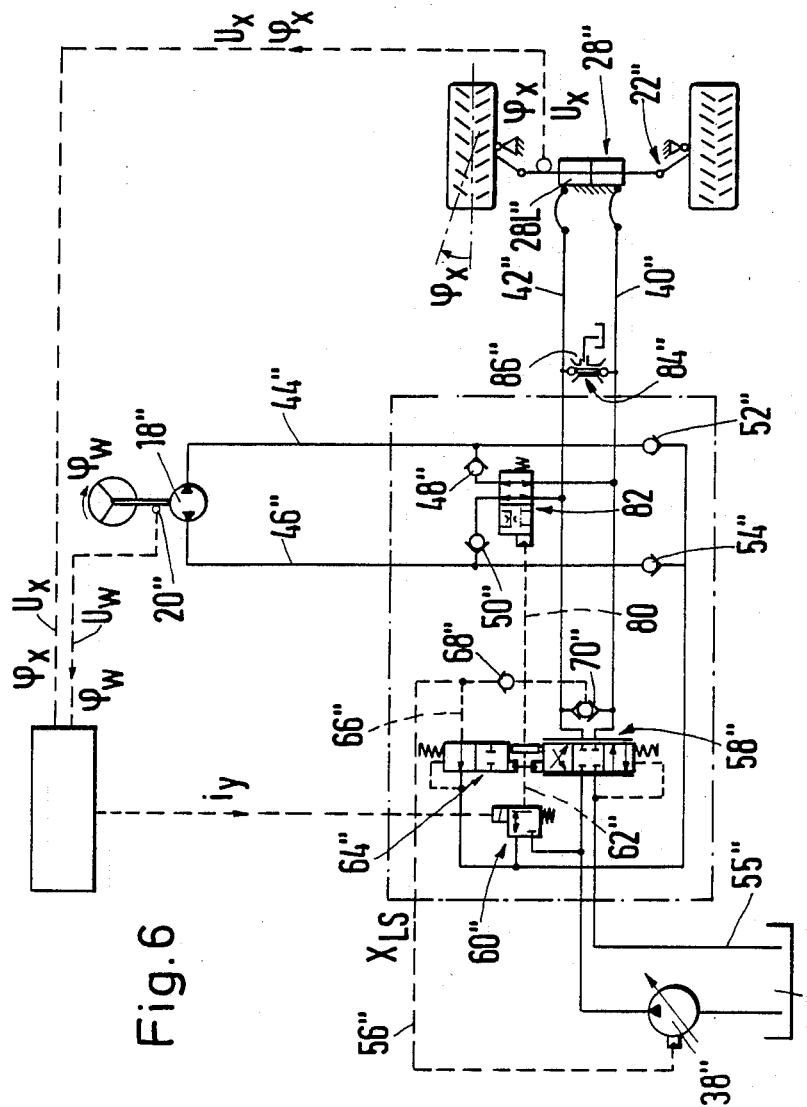
FIG. 6 a hydraulic switching circuit for a third embodiment of the hydrostatic auxiliary power steering mechanism.

FIG. 6, a third embodiment of the hydrostatic auxiliary power steering mechanism shall be described in more detail. To simplify the description, in this figure, too, those components which were already used in the embodiment according to FIGS. 4 and 5 are labeled with identical reference symbols, but are specifically designated with two apostrophes. Like the embodiment according to FIG. 5, this circuit element also serves as an energy supply to a load-sensing hydraulic system. Accordingly, the servo steering valve 58" is designed as a proportional action load-sensing distributing valve or a proportional action servo valve, which in turn is pilot-controlled by a pressure regulating valve 60". Also identical to the system according to FIG. 5, the load status line 56" is connected to a pilot valve 64" via a branch line 66" so that the load status signal $X_{LS}$ is switched to load pressure or tank pressure depending on the amount of pressure in a pilot pressure line 62", as is the case in the position shown in FIG. 6. Different from the execution according to FIG. 5, however, the load status signal $X_{LS}$ is no longer used for triggering the circuit logic block, but rather the pressure in the pilot pressure line 62" is used to switch over to emergency steering. To this end, the pilot pressure line 62" is extended by an additional control line 80 which is in contact with a switch piston of a hydraulically activated 4/2 distributing valve 82. The auxiliary pressure lines 44" and 46" are conducted through the distributing valve 82, whereby return valves 48" and 50" are again provided which open toward the working lines 40" and 42". When the pressure in the control line 80 is above a predetermined level, the switch piston of the 4/2 distributing valve 82 is shifted into a position which blocks the connection between working lines 40" and 42" and auxiliary lines 44" and 46", respectively, so that the emergency steering mimicry cannot affect the admittance of pressure to the steering cylinder 28". As soon as the pressure in the control line 80 drops, which can be the case, for example, when no more auxiliary hydraulic energy is present, or because no more electrical energy is provided for triggering the steering valve 58", or because the microcontroller determines a malfunction and turns off the electrical triggering of the pilot valve 60", then the switch piston of the 4/2 distributing valve 82 is shifted into the position shown in FIG. 6 so that the pressure generated by the hand pump 18" can propagate from one of the lines 44" or 46" through the respective return valve 48" or 50" into the accompanying working line 40" or 42" and can admit appropriate pressure to the steering cylinder 28".

It has been discussed above that the hand steering takes over the emergency steering function when various conditions are determined, for example when the microcontroller which is also designed for processing safety and diagnostic algorithms, determines a malfunction and as a result turns off the electrical triggering of the pilot valve 60 or 60". Another such condition occurs when, in the event of a failure of the auxiliary hydraulic energy, no load pressure is built up in the embodiment according to FIG. 5, or no pilot pressure in the embodiment according to FIG. 6. Finally, the steering is automatically switched to the hand steering when, due to disturbances in the electrical conduction of signals, the proper triggering of the pilot-controlled servo steering valve 58" or 58 does not occur.

Of course, the hydraulic switching circuits shown in FIGS. 4 through 6 are only examples of the implementation of the switching principle shown in FIG. 3. Circuit engineering departures are of course also possible without leaving the basic principle of the invention. Additionally, other components may be used, for example a pressure-compensated pump. Finally, it is not necessary that, for example, in the embodiment according to FIG. 5, both auxiliary pressure lines 44 and 46 be switched to tank when a control pressure is present at the return valve logic 74. Rather, it is sufficient if only that auxiliary pressure line is discharged which had pressure admitted to it by the hand pump 18, when the steering wheel 26 locked.

The preceding description shows that the parallel connection of the hand pump 18 and the auxiliary power control loop according to the invention brings about a clearer separation of signal flow and energy flow, resulting in greater possibilities for optimization in regions connected in parallel.

It has also been shown that the object of hydrostatic auxiliary power steering according to the invention makes it easily possible to integrate the hydraulic components into a system with multiple users.

Figure 7:
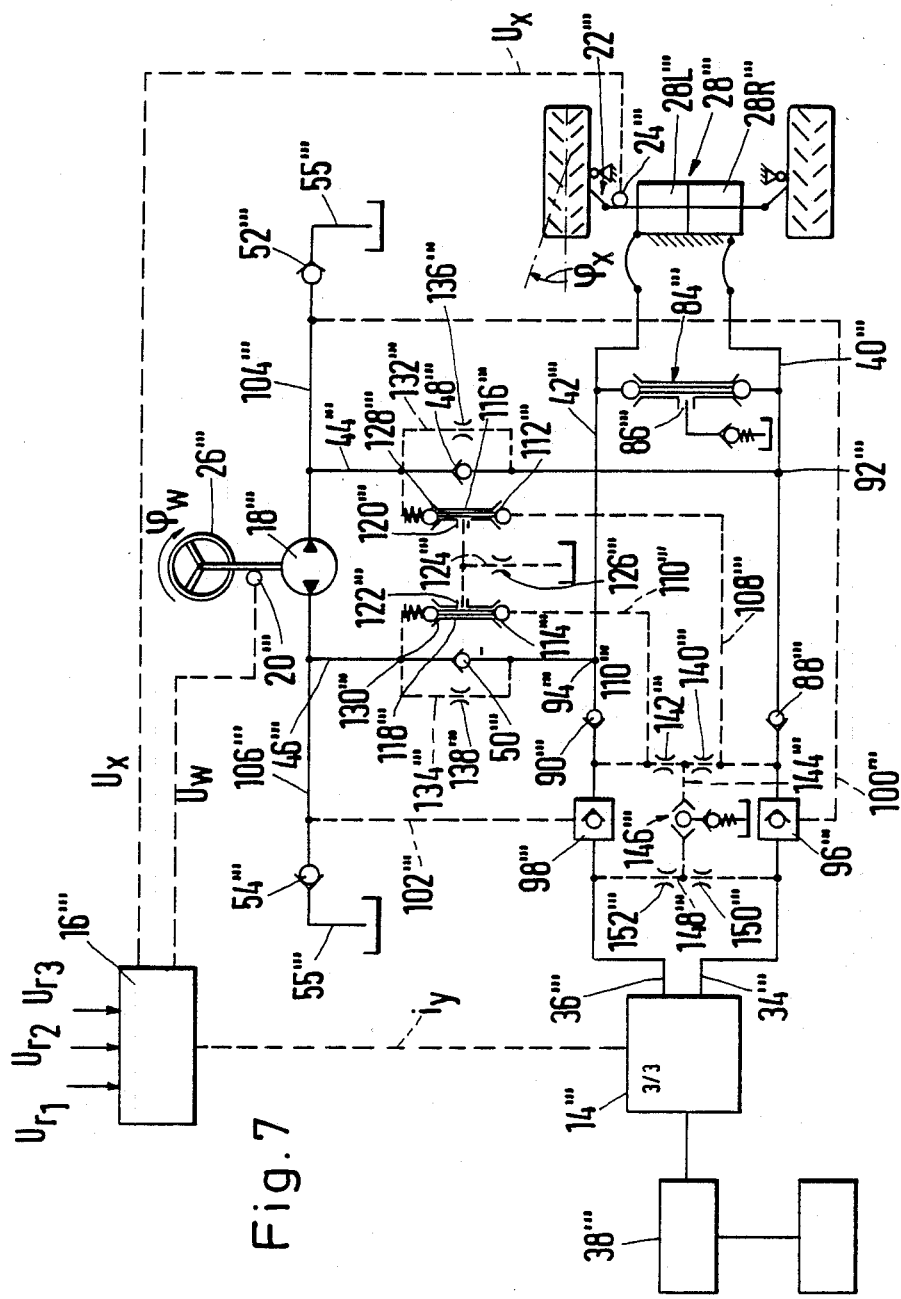
FIG. 7 a hydraulic switching circuit of a fourth embodiment of the hydrostatic auxiliary power steering mechanism.

In order to design the switching circuit of the hydrostatic auxiliary power steering mechanism in such a way that its function is secure against all imaginable malfunctions of the controlled auxiliary power, for example, in order to effectively exclude the effects of a sticking of the steering valve 14 or 58, 58", it is advantageous to execute the auxiliary power steering mechanism according to FIG. 7. In order to prevent repetition, the components which are already present in the execution according to FIG. 4 are designated with identical reference signs in the description of this execution as well, whereby each reference sign receives '" in addition.

Differing from the previously described embodiments, the steering valve 14'" is in the form of as a 3/3 distributing proportional valve, which results in a simplification. A separate tank connection controlled by the steering valve 14''' is no longer necessary since this function is taken over by the inverted shuttle valve 84'''. In this embodiment the tank connection 86''', via a return valve, takes over the discharging of the working line 40'''' or 42'''' which carries the least pressure. For this purpose a return valve 88'''' or 90'''' is integrated into each working line 40'''' and 42'''' upstream of the openings 92'''' and 94'''' of the auxiliary pressure lines 44'''' or 46''''.

Upstream of each return valve 88'''' or 90'''', a hydraulically pilot-controlled return valve 96'''' or 98'''' is provided which is controlled by a control pressure line 100'''' or 102''''. Pressure is admitted to the hydraulically pilot-controlled return valve 96'''', 98'''' from the steering valve side in the direction of closing and can be unblocked when a threshold pressure is exceeded in the control pressure line 100'''' or 102''''. Each control pressure line 100'''' or 102'''' is connected to that side of the hand pump 18'''' through which the relevant working line 40'''' or 42'''' is fed. As an example, the control pressure lines 100'''' and 102'''' open into a branch line 104'''' or 106'''' into each of which flow agent can be pulled from the tank through a non-return valve 52'''', 54''''.

In this embodiment, as a function of the return angle $[psi]_w$ of the steering wheel 26'''', with insertion of the sensor 20'''', the command variable $u_w$ is fed to the controller 16''''. At the same time, the control variable $u_x$ representing the output signal of a sensor 24'''' which transforms the actual regulating angle $[psi]_x$ of the steering linkag 22'''' is switched onto the microcontroller. As a function of the difference between the command variable $u_w$ and the control variable $u_x$ and, if applicable as a function of one other auxiliary control variable $u_r$, the microcontroller transmits a regulating signal $i_y$ in order to trigger the steering valve 14''''. The P-connection of the steering valve, not described in more detail, is fed by the pump 38''''. When the support direction by the servo mechanism and the steering direction given by the hand pump are in agreement, the proper hydraulically pilot-controlled return valve 96'''' or 98'''' is unblocked by the pressure in the appropriate control pressure line 100'''' or 102'''' so that servo pressure can enter the relevant steering cylinders 28L'''' or 28R'''' via the accompanying return valve 88'''' or 90''''. In order to ensure that a reaction feeling is transmitted to the driver which represents the forces acting on the wheels, a pressure divider circuit is provided which shall be more closely described below. This circuit has pressure status lines 108'''' and 110'''' branching off from the working line 40'''', 42'''' upstream of each return valve 88'''', 90''''. The pressure status lines are led to a first inlet connection 112'''', 114'''' of an inverted shuttle valve 116'''' or 118''''. Each inverted shuttle valve has a connection 120'''', 122'''' to a tank line 124'''', into which a first screen 126'''' is integrated. Each second inlet connection 128'''', 130'''' of the inverted shuttle valve 116'''', 118'''' is connected to the accompanying auxiliary pressure line 44'''' or 46'''' by means of a branch control line 132'''', 134'''', into which a second screen 136'''' or 138'''' is integrated with bridging of the return valve 48'''' or 50''''. It is clear from the presentation that a shared first screen 126'''' is allocated to the two inverted shuttle valves 116'''' and 118'''' in order to keep the engineering costs as low as possible. In undisturbed servo operation, for example when the return valve 98'''' is unblocked by the pressure in the pressure status line 110'''', the inverted shuttle valve 118'''' is brought into a position in which the second inlet connection 130'''' is connected to the tank connection 122''''. The pressure arising in the working line 42'''' is choked off to the tank in this way via the screens 138'''' and 124'''', which results in the presence on the accompanying hand pump side, i.e., the region of the auxiliary pressure line 46'''' located upstream of the return valve 50'''', of a pressure reduced by a constant measure which is detectable as steering resistance by the driver of the vehicle.

In order to ensure decoupling of the two pressure status lines 108'''' and 110'''' but simultaneously keeping the engineering costs as low as possible, the two pressure status lines 108'''' and 110'''' are connected to one another via two throttles 140'''' and 142'''', whereby between these two throttles a discharge line 144'''' branches off to a shuttle valve 146'''' having a tank connection. The other side of the shuttle valve 146'''' is in contact with a further coupling line 148'''' which is in contact with each of the working lines 40'''', 42'''' via another throttle 150'''', 152''''.

The preceding description makes it clear that the embodiment according to FIG. 7 comprises a safety circuit for the event that disruptions of the steering valve 14'''' occurs, for example sticking of the valve gate, which could not always be controlled by the hand pump 18. As soon as the support direction of the servo system and the steering direction given by the hand pump no longer agree, the hydraulic auxiliary energy is decoupled by means of the two hydraulically pilot-controlled return valves. In a purely emergency steering operation, the hydraulically pilot-controlled return valves no longer have a function since they are located upstream of the return valves 88'''', 90''''.

The invention thus creates a hydrostatic auxiliary power steering mechanism for motor vehicles, in which the steering cylinder power is controlled by a servo mechanism for which a control loop is provided for regulating oil quantity proportional to the turning of the steering wheel. This control loop is connected in parallel to a hand pump driven by the steering wheel. In this way, the transmission ratio of the hand pump can be selected independently of the auxiliary power control loop in such a way that the vehicle remains steerable in all operating conditions. Moreover, there results the possibility of designing the auxiliary power control loop with external feedback in such a way that disturbance variables of a control system comprising the steering valve, the steering cylinders and the steering linkage can be controlled.

What is claimed is:

1. A hydrostatic auxiliary power steering mechanism for motor vehicles comprising a steering cylinder having a power output controlled by a hydraulic servo mechanism, control loop means being provided for controlling and regulating a quantity of servo hydraulic fluid as a function of turning of a steering wheel of the vehicle, the fluid being supplied by a pump, wherein a hand pump is connected in parallel to the control loop means and is driven by the steering wheel.

2. Auxiliary power steering mechanism according to claim 1, wherein the control loop means includes a controller, a steering valve triggered by the controller, a steering cylinder and a steering linkage, means for determining a steering control angle $[psi]_x$ of the steering linkage and transmitting said angle to the controller as a control variable $[(\mu_x)]$.

3. Auxiliary power steering mechanism according to claim 2, wherein a circuit logic block is connected between the steering valve and the steering cylinder and is provided with an output signal ($Q_H$) which is proportional to a fluid volume transported by the hand pump.

4. Auxiliary power steering mechanism according to claim 2, wherein the controller is a microcontroller.

5. Auxiliary power steering mechanism according to claim 4, including transmitting means for transmitting a command variable [($\mu_w$)] representing steering wheel angular position the control variable [$\mu_x$)] representing a signal from the steering linkage, and at least one additional auxiliary control variable representing an output signal to the microcontroller so as to control said steering valve.

6. Auxiliary power steering mechanism according to claim 2, wherein the servo steering valve is a 3/3 distributing proportional valve and a return valve is provided in the working lines upstream from the openings of accompanying auxiliary pressure lines.

7. Auxiliary power steering mechanism according to claim 6, wherein a hydraulically pilot-controlled return valve receives pressure from the steering valve and is provided with a contrue pressure line connected with the hand pump through the working line, the pilot-controlled return valve being positioned in the working line upstream from each said return valve.

8. Auxiliary power steering mechanism according to claim 7, wherein downstream from the hydraulically pilot-controlled return valve a pressure status line branches off to a first inlet connection of a first inverted shuttle valve having an outlet connection connected to the tank via a first screen, a second inlet connection of a second shuttle valve being connected to the accompanying auxiliary pressure line through a branch steering line via a second screen.

9. Auxiliary power steering mechanism according to claim 8, wherein a shared first screen is connected to the two inverted shuttle valves.

10. Auxiliary power steering mechanism according to claim 9, wherein the two pressure status lines are connected to one another via two throttles between which a discharge line branches off to the tank.

11. Auxiliary power steering mechanism according to claim 10, wherein the discharge line is connected to a shuttle valve having another connection through one of two sets of throttles to each of the working lines upstream of the hydraulically pilot-controlled return valves.

* * * * *